(12) United States Patent
Kim et al.

(10) Patent No.: US 10,529,460 B2
(45) Date of Patent: Jan. 7, 2020

(54) METHOD FOR PREPARING METAL/MOLYBDENUM OXIDE NANOPARTICLES

(71) Applicant: UNIVERSITY-INDUSTRY COOPERATION GROUP OF KYUNG HEE UNIVERSITY, Yongin-si, Gyeonggi-do (KR)

(72) Inventors: Jin Soo Kim, Seongnam-si (KR); Sang Hyuk Im, Yongin-si (KR); Jin Hyuck Heo, Suwon-si (KR); Kyung Min Im, Yongin-si (KR); Woo Sik Kim, Seoul (KR)

(73) Assignee: UNIVERSITY-INDUSTRY COOPERATION GROUP OF KYUNG HEE UNIVERSITY, Yongin-si, Gyeonggi-Do (KR)

( * ) Notice: Subject to any disclaimer, the term of this patent is extended or adjusted under 35 U.S.C. 154(b) by 0 days.

(21) Appl. No.: 15/865,971

(22) Filed: Jan. 9, 2018

(65) Prior Publication Data
US 2019/0071320 A1  Mar. 7, 2019

(30) Foreign Application Priority Data
Sep. 4, 2017  (KR) .................. 10-2017-0112865

(51) Int. Cl.
| | |
|---|---|
| *H01B 1/08* | (2006.01) |
| *C09C 1/00* | (2006.01) |
| *B01J 23/28* | (2006.01) |
| *C01G 39/02* | (2006.01) |
| *C01F 11/00* | (2006.01) |
| *C01D 1/02* | (2006.01) |
| *C01D 15/02* | (2006.01) |
| *B01J 23/882* | (2006.01) |
| *B01J 23/883* | (2006.01) |
| *B01J 23/885* | (2006.01) |
| *B01J 35/00* | (2006.01) |

(52) U.S. Cl.
CPC ............... *H01B 1/08* (2013.01); *B01J 23/28* (2013.01); *B01J 23/882* (2013.01); *B01J 23/883* (2013.01); *B01J 23/885* (2013.01); *B01J 35/002* (2013.01); *B01J 35/0013* (2013.01); *C01G 39/02* (2013.01); *C09C 1/0003* (2013.01); *C01D 1/02* (2013.01); *C01D 15/02* (2013.01); *C01F 11/00* (2013.01); *C01P 2002/72* (2013.01); *C01P 2004/03* (2013.01)

(58) Field of Classification Search
CPC . C01G 39/02; B01J 23/28; C01D 1/02; C01D 15/02; C01F 11/00; C01P 2002/72; C01P 2004/03; H01B 1/08
USPC ....................................... 252/500
See application file for complete search history.

(56) References Cited

U.S. PATENT DOCUMENTS

2011/0068327 A1* 3/2011 Morishima ......... H01L 51/5052
257/40

FOREIGN PATENT DOCUMENTS

KR  10-1647001 B1  8/2016

OTHER PUBLICATIONS

Chen et al. "Selectivesynthesis of metastable MoO2 nanocrystallites through a solution-phase approach". Chemical Physics Letters 418 (2006) 105-108. Available online Nov. 10, 2005. Total pp. 4. (Year: 2005).*

Choi et al. "Production of molybdenum oxide particles with high yield by ultrasonic spray pyrolysis and their catalytic activity toward partial oxidation of n-dodecane". Journal of Analytical and Applied Pyrolysis 112 (2015) 276-283. Available online Feb. 1, 2015. Total pp. 8. (Year: 2015).*

He Qian et al., Effect of titanium doping on the structure and reducibility of nanoparticle molybdenum dioxide, Journal of Nanoparticle Research, Apr. 8, 2014, pp. 1-12, vol. 16.

* cited by examiner

*Primary Examiner* — Harold Y Pyon
*Assistant Examiner* — Matthew R Diaz
(74) *Attorney, Agent, or Firm* — Novick, Kim & Lee, PLLC; Jae Youn Kim

(57) ABSTRACT

Provided is a method for preparing metal/molybdenum oxide nanoparticles, the method including: preparing polycrystalline molybdenum oxide particles; and obtaining metal-doped molybdenum oxide nanoparticles by dissolving the polycrystalline molybdenum oxide particles and a metal precursor in a first solvent, and then performing a solvothermal reaction.

12 Claims, 8 Drawing Sheets

METHOD FOR PREPARING METAL/MOLYBDENUM OXIDE NANOPARTICLES

CROSS-REFERENCE TO RELATED APPLICATION

This application claims priority to and the benefit of Korean Patent Application No. 2017-0112865, filed on Sep. 4, 2017, the disclosure of which is incorporated herein by reference in its entirety. Further, this application claims the grace period exception under 35 U.S.C. 102(a)(1) over the inventors' own publication, "Scalable synthesis of Ti-doped MoO2 nanoparticle-hole-transporting-material with high moisture stability for CH3NH3PbI3 perovskite solar cells," available online Jul. 29, 2017, Chemical Engineering Journal, Volume 330, 15 Dec. 2017, Pages 698-705, which is concurrently filed with this application.

BACKGROUND

1. Field of the Invention

The present invention relates to a method for preparing metal/molybdenum oxide nanoparticles, and more particularly, to a method for preparing metal/molybdenum oxide nanoparticles by a solvothermal reaction.

2. Discussion of Related Art

Molybdenum trioxide ($MoO_3$) has been used as a semiconductor material, a field emitter, an electrochromic material, a photochromic material, and a gas sensor. In the related art, pure molybdenum trioxide was synthesized in various forms such as nanorods, nanobelts, and nanofibers.

Molybdenum trioxide may be converted into molybdenum dioxide by reduction by hydrogen treatment. Molybdenum dioxide has attracted a lot of attention as a fuel-reforming catalyst, a selective cathode material for a solid oxidation fuel battery, and the like due to sulfuric acid tolerance and coke resistance in partial oxidation of a hydrocarbon compound.

In studies conducted so far, molybdenum oxides having various structures were synthesized by using various methods such as a solvothermal reaction, a sol-gel method, and a chemical vapor deposition method. In general, molybdenum oxides are synthesized at 120° C. to 200° C. by a hydrothermal method and a solvothermal synthesis method.

The hydrothermal method and the solvothermal synthesis method have advantages in that the solubility of a ceramic precursor is easily adjusted, high-purity particles may be prepared, and the size and morphology of particles may be easily adjusted depending on temperature, pressure, precursor concentration, time, and the like.

However, the hydrothermal method and the solvothermal synthesis method have disadvantages in that during mass production, the yield is low, the shape of particles is non-uniform, and the particle size distribution is broad. In order to solve these problems, molybdenum trioxide microparticles were put into a solvent in which water and a reducing agent were mixed, and solvothermal cracking was caused in a high-pressure reactor, thereby synthesizing nanoparticles having a molybdenum dioxide ($MoO_2$) crystal phase. However, molybdenum dioxide nanoparticles have disadvantages in that the crystal phase is unstable, and thus, is changed even at room temperature over time, and various physical property values deteriorate for this reason.

Therefore, there is a continuous need for studies on a method for preparing molybdenum dioxide particles with improved stability of the crystal phase.

SUMMARY OF THE INVENTION

The present invention has been made in an effort to solve the above-described problems in the related art, and an object of the present invention is to provide a method for preparing metal/molybdenum nanoparticles with improved stability of the crystal phase of molybdenum nanoparticles even after a long period of time has elapsed.

An aspect of the present invention provides a method for preparing metal/molybdenum oxide nanoparticles, the method including: (a) preparing polycrystalline molybdenum oxide particles; and (b) obtaining metal-doped molybdenum oxide nanoparticles by dissolving the polycrystalline molybdenum oxide particles and a metal precursor in a first solvent, and then performing a solvothermal reaction.

In an exemplary embodiment, Step (a) may comprise: (a1) preparing a precursor solution by dissolving a molybdenum salt in a second solvent; (a2) generating an aerosol by applying ultrasonic waves to the precursor solution, and spraying the aerosol into a reactor by using a carrier gas; and (a3) obtaining polycrystalline molybdenum oxide particles by pyrolyzing the aerosol.

In an exemplary embodiment, the molybdenum salt may be one selected from the group consisting of lithium molybdate ($Li_2MoO_4$), calcium molybdate ($CaMoO_4$) potassium molybdate ($K_2MoO_4$), sodium molybdate ($NaMoO_4$), molybdenum chlorides ($MoCl_5$, $MoCl_3$, $MoOCl_4$), ammonium molybdate ($(NH_4)_6Mo_7O_{24} \cdot H_2O$), and a mixture thereof.

In an exemplary embodiment, the second solvent may be one selected from the group consisting of methanol, ethanol, propanol, butanol, methoxyethanol, ethoxyethanol, lactones, acetonitrile, n-methyl-2-pyrrolidone (NMP), formic acid, nitromethane, acetic acid, dimethyl sulfoxide, distilled water, and a mixture thereof.

In an exemplary embodiment, a concentration of the precursor solution may be 0.05 to 0.5 M.

In an exemplary embodiment, the carrier gas may be one selected from the group consisting of air, nitrogen, oxygen, helium, argon, and a mixture thereof.

In an exemplary embodiment, in Step (a3), the pyrolysis temperature may be 450 to 650° C.

In an exemplary embodiment, in Step (a3), the molybdenum oxide particles may be molybdenum trioxide ($MoO_3$).

In an exemplary embodiment, the metal precursor may include one selected from the group consisting of Ti, Zr, Mn, Fe, Co, Cu, Ni, Pd, Ag, Au, and a mixture thereof.

In an exemplary embodiment, a concentration of the metal precursor may be 1 to 10 wt %.

In an exemplary embodiment, the first solvent may be a mixture of distilled water and a reducing solvent.

In an exemplary embodiment, the first solvent may be prepared by mixing the distilled water and the reducing solvent at a weight ratio of 1 to 3:1.

In an exemplary embodiment, in Step (b), the solvothermal reaction temperature may be 100 to 300° C.

In an exemplary embodiment, in Step (b), the solvothermal reaction time may be 1 to 12 hours.

In an exemplary embodiment, the metal-doped molybdenum oxide nanoparticles may be represented by the following Chemical Formula 1.

$M/MoO_{3-x}$ <Chemical Formula 1>

In Chemical Formula 1, $0 < X \leq 1$.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

Figure 1:
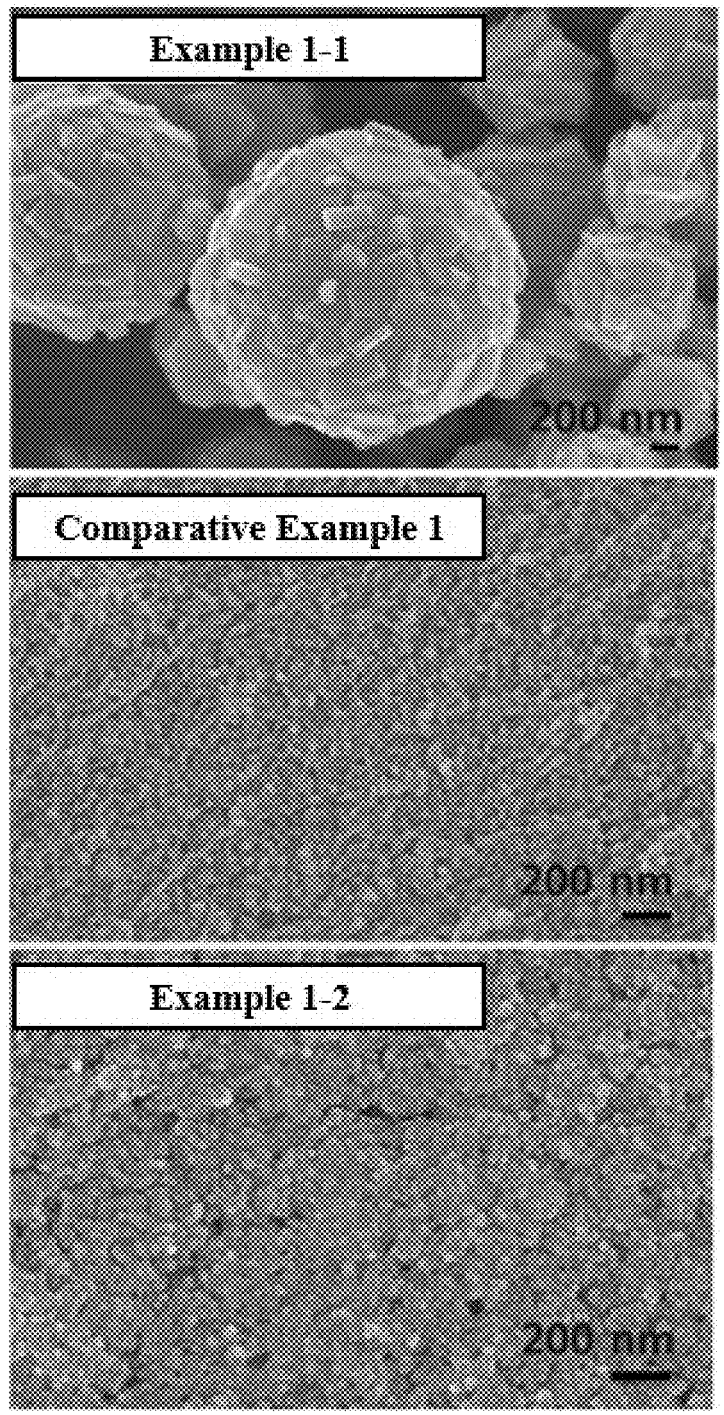
FIG. 1 illustrates scanning electron microscopic (SEM) analysis results of the surfaces of metal/molybdenum oxide nanoparticles according to examples of the present invention and a comparative example.

Hereinafter, the present invention will be described with reference to the accompanying drawings. However, the present invention can be implemented in various different forms, and is not limited to the Examples described herein.

Throughout the specification, when one part is "connected" to another part, this includes not only a case where they are "directly connected to each other", but also a case where they are "indirectly connected to each other" with another member therebetween. Further, when one part "includes" one constituent element, unless otherwise specifically described, this does not mean that another constituent element is excluded, but means that another constituent element may be further included.

An exemplary embodiment of the present invention provides a method for preparing metal/molybdenum oxide nanoparticles, the method including: (a) preparing polycrystalline molybdenum oxide particles; and (b) obtaining metal-doped molybdenum oxide nanoparticles by dissolving the polycrystalline molybdenum oxide particles and a metal precursor in a first solvent, and then performing a solvothermal reaction.

In Step (a), molybdenum oxide particles may be prepared, and specifically, Step (a) may include: (a1) preparing a precursor solution by dissolving a molybdenum salt in a second solvent; (a2) generating an aerosol by applying ultrasonic waves to the precursor solution, and spraying the aerosol into a reactor by using a carrier gas; and (a3) obtaining polycrystalline molybdenum oxide particles by pyrolyzing the aerosol.

The polycrystalline molybdenum oxide particles in Step (a) may be microparticles having a size of 0.5 to 5 μm, and the size is preferably 0.7 to 3 μm, but is not limited thereto. When the size of the polycrystalline molybdenum oxide particles is 0.5 μm or less, reactivity is increased due to an increase in surface area of the particles, and as a result, particle aggregation phenomenon may occur, and when the size of the polycrystalline molybdenum oxide particles is more than 5 m, the size of the particles is so large that a problem in that it is difficult to dissolve the particles in the first solvent may occur in Step (b).

The molybdenum salt may be one selected from the group consisting of lithium molybdate ($Li_2MoO_4$), calcium molybdate ($CaMoO_4$), potassium molybdate ($K_2MoO_4$), sodium molybdate ($NaMoO_4$), molybdenum chlorides ($MoCl_5$, $MoCl_3$, $MoOCl_4$), ammonium molybdate (($NH_4)_6Mo_7O_{24}.H_2O$), and a mixture thereof, and is preferably ammonium molybdate, but is not limited thereto.

The second solvent may be one selected from the group consisting of methanol, ethanol, propanol, butanol, methoxyethanol, ethoxyethanol, lactones, acetonitrile, n-methyl-2-pyrrolidone (NMP), formic acid, nitromethane, acetic acid, dimethyl sulfoxide, distilled water, and a mixture thereof, and is preferably distilled water, but is not limited thereto.

The concentration of the precursor solution may be 0.05 to 0.5 M, and is preferably 0.1 to 0.5 M. When the concentration of the precursor solution is less than 0.05 M, the amount of molybdenum ions is not sufficient, and as a result, it is difficult to synthesize spherical molybdenum oxide particles, and when the concentration of the precursor solution is more than 0.5 M, the form and size of the synthesized molybdenum oxide particles may be non-uniform.

The carrier gas may be one selected from the group consisting of air, nitrogen, oxygen, helium, argon, and a mixture thereof, and is preferably nitrogen, but is not limited thereto. Since a residence time of the aerosol, which is a reactant, in a reactor is determined by the flow rate of the carrier gas, the flow rate of the carrier gas may be adjusted such that the residence time is about 2 seconds, in consideration of productivity.

The pyrolysis temperature in Step (a3) may be 450 to 650° C., and is preferably 500 to 630° C. When the pyrolysis temperature is less than 450° C., the precursor solution is not completely pyrolyzed, and as a result, it is difficult to synthesize molybdenum oxide particles, and when the pyrolysis temperature is more than 650° C., the form of the molybdenum oxide particles deviates from the spherical shape, and thus may become non-uniform.

When the same solvent and the same carrier gas are used in Steps (a1) and (a2), for example, when distilled water and nitrogen are used as the second solvent and the carrier gas, respectively, molybdenum oxide particles synthesized and obtained in Step (a3) may be molybdenum trioxide ($MoO_3$).

In Step (b), metal-doped molybdenum oxide nanoparticles may be obtained by dissolving the polycrystalline molybdenum oxide particles and the metal precursor in the first solvent, and then performing a solvothermal reaction.

The metal precursor may include one selected from the group consisting of Ti, Zr, Mn, Fe, Co, Cu, Ni, Pd, Ag, Au, and a mixture thereof, and is preferably Ti, Cu, Fe, Co, or Ni, but is not limited thereto. When the metal precursor is Ti, a divalent metal, or a tetravalent metal, the ion radius size thereof is similar to that of a molybdenum tetravalent ion ($MoO_2$), so that it may be easily doped on the molybdenum oxide nanoparticles. Further, when the metal precursor is Co, Ni, Pd, Ag, Au, or the like, the crystallinity of the molybdenum oxide nanoparticles is stabilized, whereas it is also possible to have a catalytic activity due to abundant electrons.

The concentration of the metal precursor may be 1 to 10 wt %, and is preferably 3 to 5 wt %. When the concentration of the metal precursor is less than 1 wt %, the amount of metal doped onto the surfaces of molybdenum particles is so small that it is difficult to improve the crystal stability of the molybdenum oxide nanoparticles, and when the concentration of the metal precursor is more than 10 wt %, there is a limitation on the amount of metal capable of being doped in the molybdenum oxide nanoparticle lattice, and as a result, the economic efficiency may be reduced, and when the amount of metal doped is larger than that of molybdenum oxide nanoparticles, there arises a problem in that characteristics of the molybdenum oxide nanoparticles deteriorate.

The first solvent may be a mixture of distilled water and a reducing solvent.

The type of reducing solvent is not particularly limited as long as the reducing solvent can sequentially reduce the molybdenum trioxide particles obtained in Step (a3) to molybdenum dioxide nanoparticles under a predetermined condition. For example, the reducing solvent may be a diol-, polyol-, or glycol ether-type compound, glycerol, glucose, dimethylformamide, dimethylacetamide, ascorbic acid, citric acid, hydrazine hydrate, sodium hydride, hydroquinone, sodium borohydride, or a mixture thereof, and is preferably ethylene glycol, but is not limited thereto.

The first solvent may be prepared by mixing the distilled water and the reducing solvent at a weight ratio of 1 to 3:1. When the ratio of the reducing solvent is higher than that of the distilled water, an intermediate or byproduct such as $Mo_4O_{11}$ is produced, so that the yield of molybdenum oxide nanoparticles by reduction may be reduced.

When the reducing solvent is ethylene glycol, the ethylene glycol may be converted into glycol aldehyde through heating, and the molybdenum trioxide particles may be reduced to molybdenum dioxide by the glycol aldehyde. Since orthorhombic molybdenum trioxide (Pbnm, a=3.697 Å, b=13.864 Å, c=3.963 Å) has a larger unit cell than monoclinic molybdenum dioxide (P21/c, a=5.6 Å, b=4.85 Å, c=5.53 Å) and about 34% of a volume of the unit cell may be converted into molybdenum dioxide from molybdenum trioxide through a phase transition, when a solution of the molybdenum trioxide particles is heated, polycrystalline molybdenum trioxide particles may be decomposed along a crystal grain boundary through thermal expansion, and the decomposed crystalline particles may be cracked by a solvothermal reaction.

The solvothermal reaction temperature may be 100 to 300° C., and is preferably 120 to 200° C. When the solvothermal reaction temperature is less than 100° C., the distilled water component in the first solvent may not be evaporated, and when the solvothermal reaction temperature is more than 300° C., the size and shape uniformity of metal/molybdenum oxide nanoparticles, which are a product, may be reduced.

The solvothermal reaction time in Step (b) may be 1 to 12 hours, and preferably, it is appropriately adjusted depending on the range of the pyrolysis temperature in Step (a3).

Specifically, when the pyrolysis temperature is 560 to 640° C., the solvothermal reaction may be carried out for at least 10 hours, preferably, 10 hours to 12 hours. When the reaction time is less than 10 hours, the purity of metal/molybdenum oxide nanoparticles to be obtained may be reduced, and when the reaction time is more than 12 hours, the surface area is significantly reduced, and as a result, the activity of the nanoparticles may be reduced.

Further, when the pyrolysis temperature is 460 to 540° C., the solvothermal reaction may be carried out for at least 1 hour, preferably, 2 to 8 hours. When the reaction time is less than 1 hour, the purity of metal/molybdenum oxide nanoparticles to be obtained may be reduced, and when the reaction time is more than 8 hours, the surface area is significantly reduced, and as a result, the activity of the nanoparticles may be reduced.

The metal-doped molybdenum oxide nanoparticles are those in which while the molybdenum trioxide particles are reduced along with the metal precursor by the solvothermal reaction, the size of the particles is significantly reduced, and may be represented by the following Chemical Formula 1.

$$M/MoO_{3-x} \qquad \text{<Chemical Formula 1>}$$

In Chemical Formula 1, X may be a real number satisfying the range of 0<X≤1, and preferably, X is 1. That is, as the reduction reaction of the molybdenum oxide particles proceeds, metal/molybdenum oxide nanoparticles at various molar ratios may be sequentially or simultaneously produced, but preferably, a final product is metal/molybdenum dioxide nanoparticles.

Hereinafter, Examples of the present invention will be described in detail.

Example 1-1: Preparation of Molybdenum Oxide Particles 200 mL of a 0.5 M precursor solution was prepared by dissolving 21.53 g of ammonium molybdate tetrahydrate $((NH_4)_6Mo_7O_{24} \cdot 4H_2O$, 81 to 83%, Aldrich) in distilled water at 400 rpm for 40 minutes.

The precursor solution was sprayed into a quartz tube reactor with a length of 1200 mm, an inner diameter of 30 mm and an outer diameter of 34 mm using a 1.7 MHz ultrasonic wave sprayer having six vibrators, and in this case, nitrogen was used as a carrier gas, a flow rate was adjusted to 4.8 L/min to 6.7 L/min, and a residence time in the reactor was fixed to two seconds. A heater was installed at an outer wall of the quartz tube reactor, and a temperature in the reactor was set to 600° C. by using a thermocouple and a PID temperature controller.

Molybdenum trioxide (hereinafter, referred to as '$MoO_3$') particles were captured at the rear end of the quartz tube reactor by using a Teflon filter, and a hot wire was wound around the outer wall of the Teflon filter to prevent re-condensation of vapor, thereby maximizing the yield.

Example 1-2: Preparation of Metal/Molybdenum Oxide Nanoparticles 1.2 g of $MoO_3$ prepared in Example 1-1 was put into a solvent in which 40 ml of distilled water and 40 ml of ethylene glycol were mixed, 0.202 g of $C_{16}H_{28}O_6Ti$ (titanium diisopropoxide bis(acetylacetonate), 75 wt % in isopropanol, Aldrich), which is a metal precursor, was dissolved in 5 ml of methanol, and then before the two solvents were mixed, three drops of $C_6H_{15}NO_3$ (triethanolamine, TEA) were dropped into a mixed solvent of distilled water and ethylene glycol, in which $MoO_3$ was dispersed, and the resulting solution was mixed with a solution containing the metal precursor. After a solvothermal reaction was carried out at 210° C. for 12 hours by introducing the mixed solution into a Teflon-coated autoclave, the resulting product was centrifuged at 14,000 rpm for 30 minutes and washed three times with methanol, and then dried at 90° C. for 12 hours, thereby obtaining titanium/molybdenum dioxide (Ti/$MoO_2$) nanoparticles.

Example 2

Ni/MoO$_2$ nanoparticles were obtained in the same manner as in Example 1-2, except that as the metal precursor, NiNO$_3$.4H$_2$O (nickel nitrate hexahydrate, ≥87%, Aldrich) was used.

Example 3

Cu/MoO$_2$ nanoparticles were obtained in the same manner as in Example 1-2, except that as the metal precursor, CuSO$_4$.5H$_2$O (cupric sulfate pentahydrate, Aldrich) was used.

Example 4

(Ni/Ti)/MoO$_2$ nanoparticles were obtained in the same manner as in Example 1-2, except that as the metal precursor, NiNO$_3$.4H$_2$O and C$_{16}$H$_{28}$O$_6$Ti were used.

Example 5

Co/MoO$_2$ nanoparticles were obtained in the same manner as in Example 1-2, except that as the metal precursor, CoCl$_2$.6H$_2$O (cobalt chloride, Aldrich) was used.

Comparative Example 1

MoO$_2$ nanoparticles were obtained in the same manner as in Example 1-2, except that during the solvothermal reaction, pure distilled water was used as the solvent (hydrothermal synthesis) and the metal precursor solution was not used.

Comparative Example 2

Ti/MoO$_2$ nanoparticles were obtained in the same manner as in Example 1-2, except that during the solvothermal reaction, a solvent in which 20 ml of distilled water and 60 ml of ethylene glycol were mixed was used.

Experimental Example 1

Figure 2:
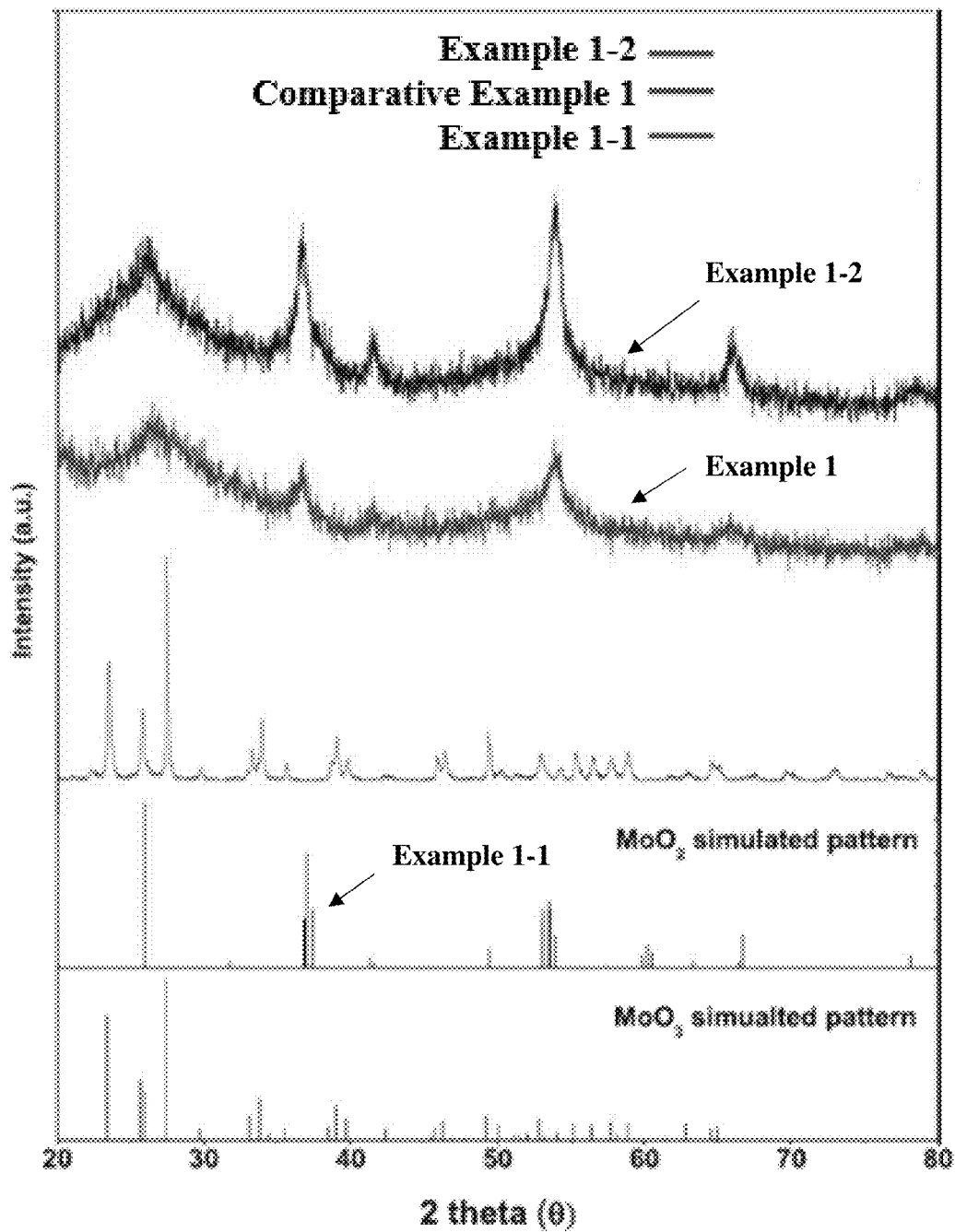
FIG. 2 illustrates X-ray diffraction (XRD) pattern analysis results of metal/molybdenum oxide nanoparticles according to examples of the present invention.

SEM and XRD pattern analysis results for the molybdenum oxide nanoparticles obtained according to Examples 1-1 and 1-2 and Comparative Example 1 are shown in FIG. 1 and FIG. 2, respectively.

Example 1-1 is an MoO$_3$ microparticle synthesized by a spray pyrolysis method, which is a spherical polycrystalline particle having a diameter of about 2.2 μm. As shown in the XRD pattern analysis results in FIG. 2, it can be confirmed that the pattern of the spherical polycrystalline particles is the same as that of pure molybdenum trioxide particles.

Example 1-2 and Comparative Example 1 are molybdenum oxide nanoparticles, and it can be confirmed that the size of the particles is significantly smaller than that of Example 1-1, which are microparticles. Further, as shown in the XRD pattern analysis results in FIG. 2, it can be seen that Example 1-2 and Comparative Example 1 have peaks at the same positions as the pattern of pure molybdenum dioxide particles. It can be confirmed that the peaks in Example 1-2 have a sharper form and higher peak intensities than those in Comparative Example 1. That is, it can be determined that metal-doped metal/molybdenum oxide nanoparticles have a uniform particle shape and high crystallinity as compared to molybdenum oxide nanoparticles that are not doped with a metal.

Experimental Example 2

Figure 3:
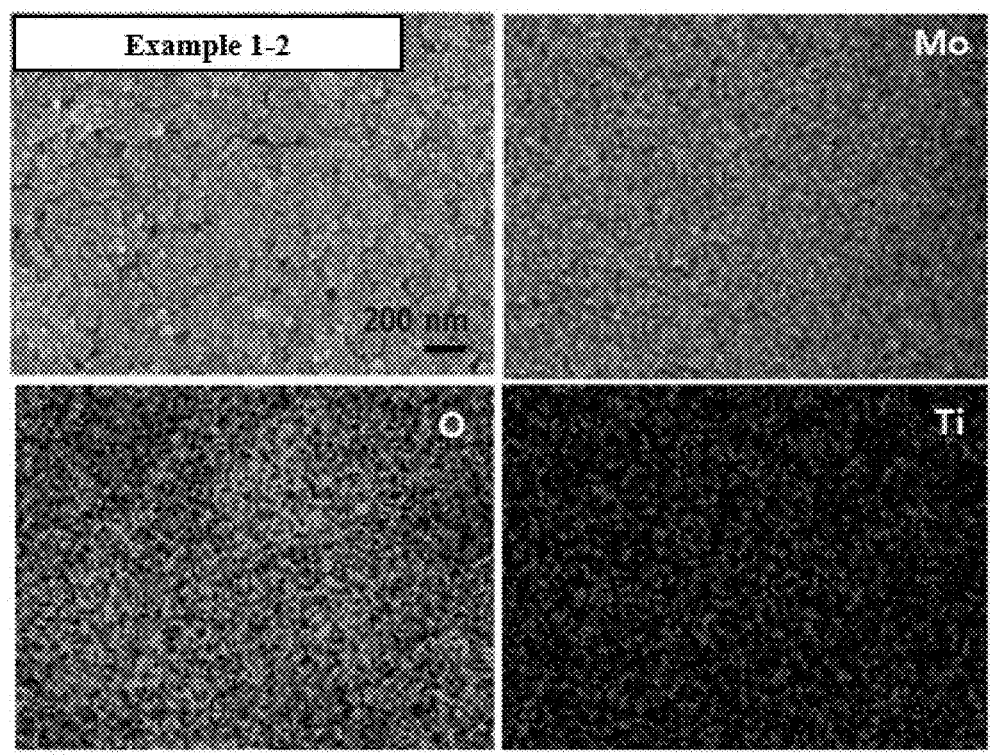
FIG. 3 illustrates energy-dispersive X-ray (EDX) analysis results for each constituent component of metal/molybdenum oxide nanoparticles according to an example of the present invention.
Figure 4A:
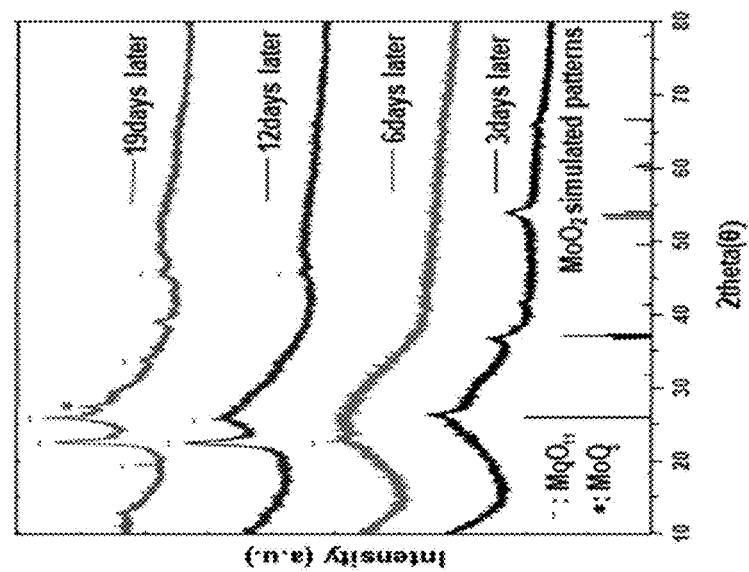
FIGS. 4A-4D illustrate XRD pattern analysis results of metal/molybdenum oxide nanoparticles according to examples of the present invention for the evaluation of crystal stability depending on the type of metal precursor.
Figure 4B:
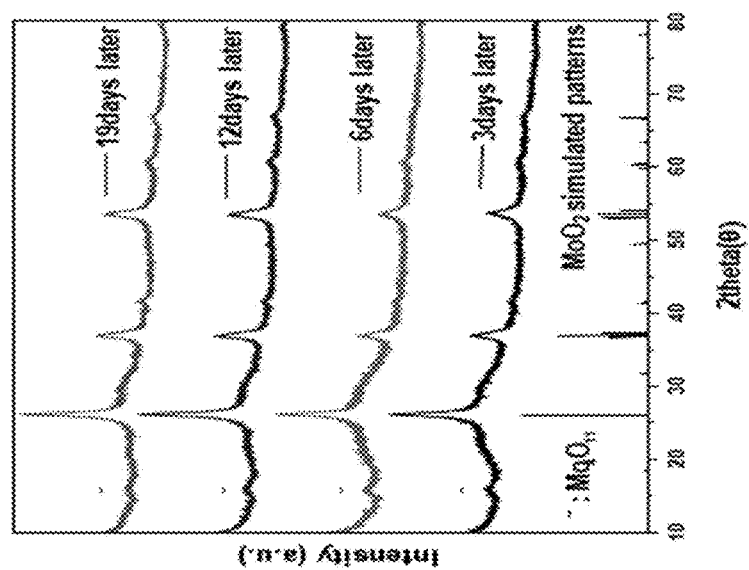
Figure 4D:
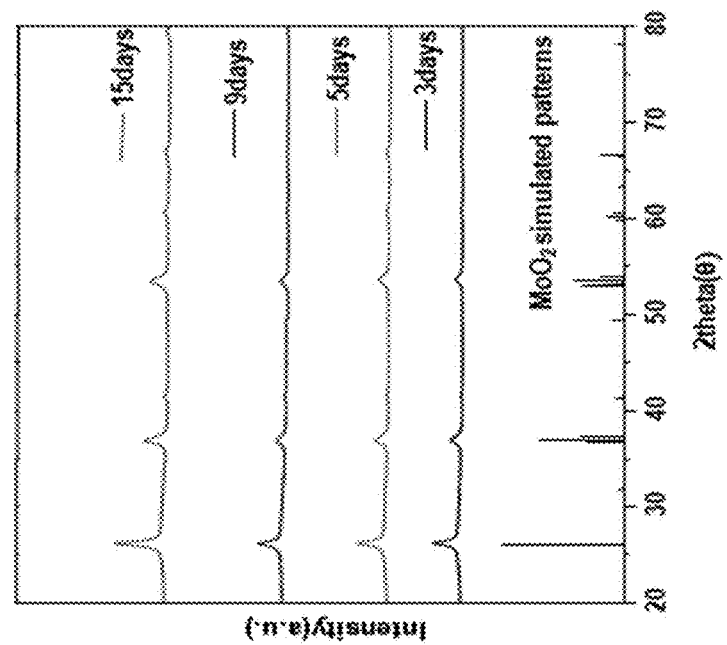
Figure 4C:
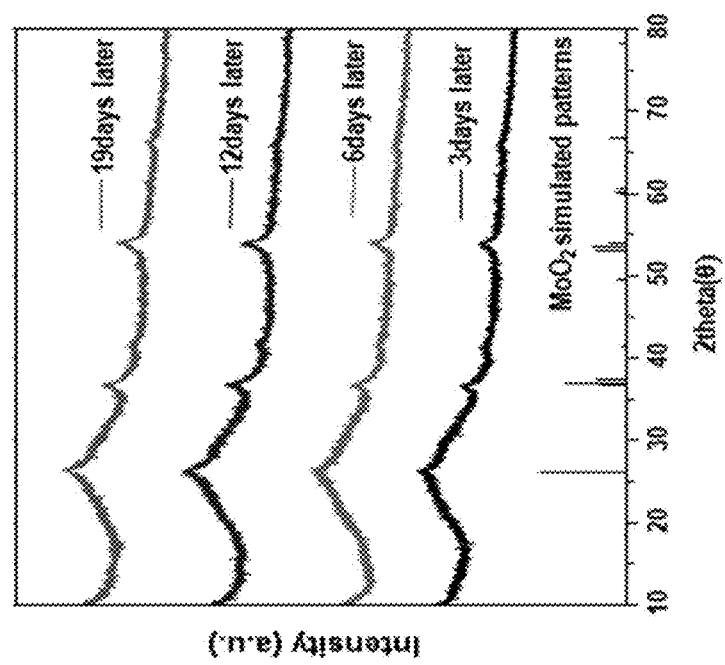

EDX analysis results for constituent components of Ti/MoO$_2$ nanoparticles obtained according to Example 1-2 are shown in FIG. 3.

Referring to FIG. 3, as can be seen from the fact that Mo, Ti, and O, which are constituent components of the Ti/MoO$_2$ nanoparticles, are uniformly distributed, the surfaces of molybdenum oxide nanoparticles are successfully doped with a metal.

Experimental Example 3

The metal/molybdenum oxide nanoparticles obtained according to the Examples and the Comparative Examples were put into distilled water, the resulting mixture was placed in an oven at 60° C., crystal stability over time was evaluated, and the results are shown in FIG. 4 and FIG. 5.

FIGS. 4A-4D show XRD pattern analysis results for the evaluation of crystal stability of (a) Ni/MoO$_2$ nanoparticles in Example 2, (b) Cu/MoO$_2$ nanoparticles in Example 3, (c) (Ni/Ti)/MoO$_2$ nanoparticles in Example 4, and (d) Co/MoO$_2$ nanoparticles in Example 5 per time, respectively. In the case of Examples 2, 4, and 5, as can be seen from the fact that the shapes of the peaks are maintained, the crystal is maintained without collapsing even when 19 days or more have elapsed.

In the case of Example 3, it can be confirmed that even though the crystal is stably maintained without collapsing until day 3, the crystal collapsed on day 6, and thus on day 6 and thereafter, the XRD peaks are gentle and peaks of impurities (Mo$_4$O$_{11}$, MoO$_3$) are produced. It is analyzed due to the fact that as air, moisture, and highly reactive Cu are doped, the crystal phase rapidly collapsed as compared to molybdenum oxide nanoparticles doped with other metal precursors.

Figure 5A:
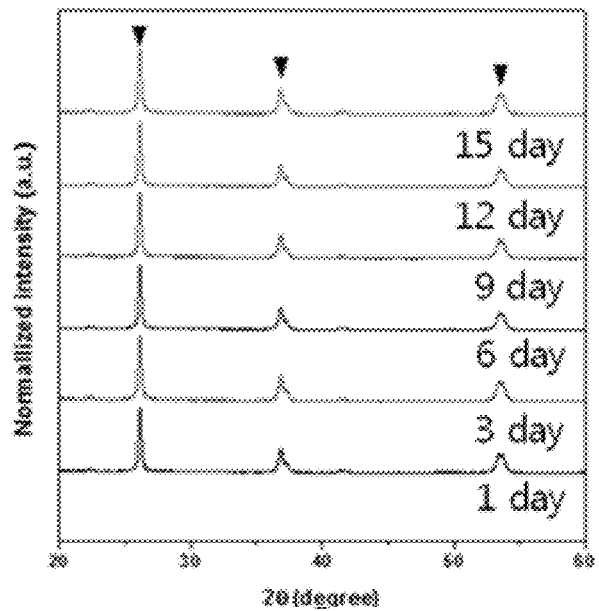
FIGS. 5A and 5B illustrate XRD pattern analysis results of metal/molybdenum oxide nanoparticles according to an example of the present invention and a comparative example for the evaluation of crystal stability.
Figure 5B:
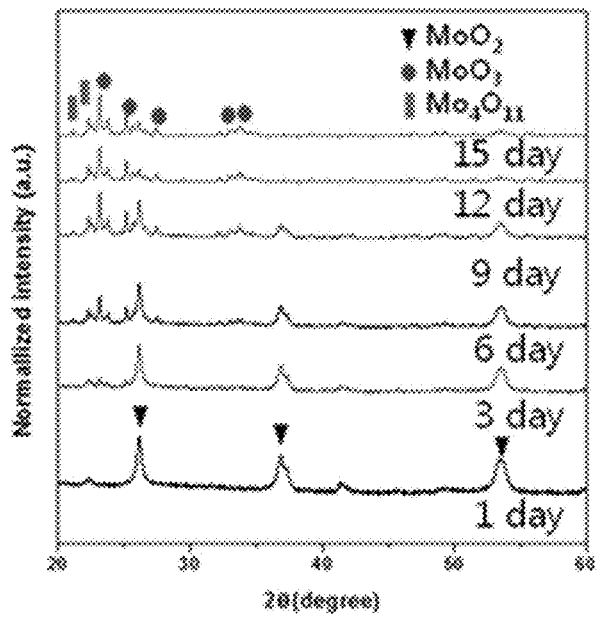

However, referring to FIGS. 5A and 5B, when a comparison is made between (a) Ti/MoO$_2$ nanoparticles in Example 1-2 as shown in FIG. 5A and (b) MoO$_2$ nanoparticles in Comparative Example 1 as shown in FIG. 5B, it can be confirmed that in the case of (a) in which oxide nanoparticles are doped with a metal, the shapes of the XRD peaks are maintained without being changed even after 15 days have elapsed, whereas in the case of (b) in which oxide nanoparticles are not doped with a metal, on day 3 and thereafter, impurity peaks are produced, the peaks are gentle, and the crystal phase collapses. That is, it can be confirmed that even though the molybdenum oxide nanoparticles are doped with metal which is highly reactive to air or moisture, crystal stability is excellent as compared to molybdenum oxide nanoparticles which are not doped with a conventional metal.

Preparation Example 1

A perovskite (CH$_3$NH$_3$PbI$_3$) solar cell was prepared by applying the Ti/MoO$_2$ nanoparticles obtained according to Example 1-2 to a hole-transporting material.

Experimental Example 4

Figure 6:
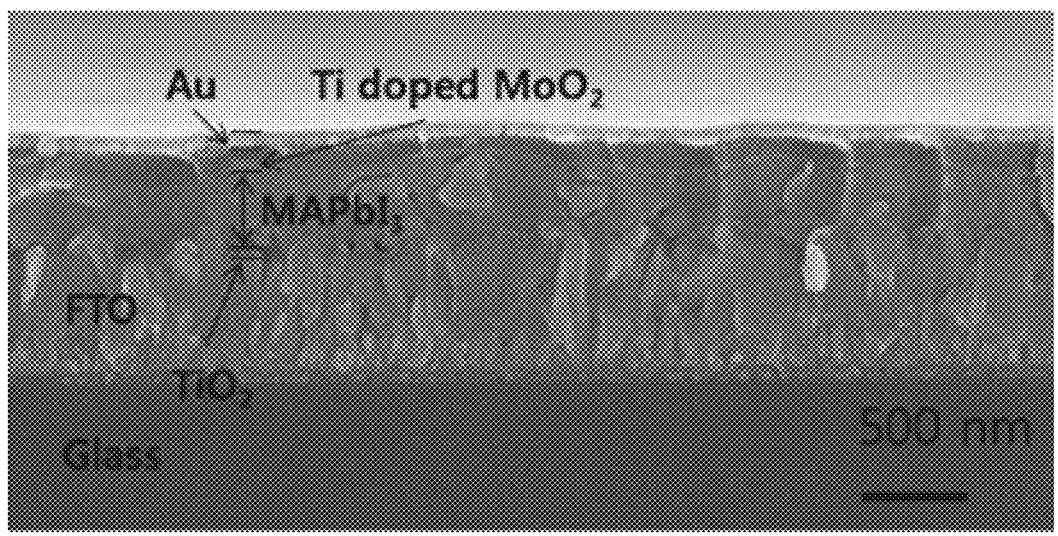
FIG. 6 illustrates an SEM analysis result of a cross-section of a perovskite solar cell prepared by using metal/molybdenum oxide nanoparticles prepared according to an example of the present invention.
Figure 7:
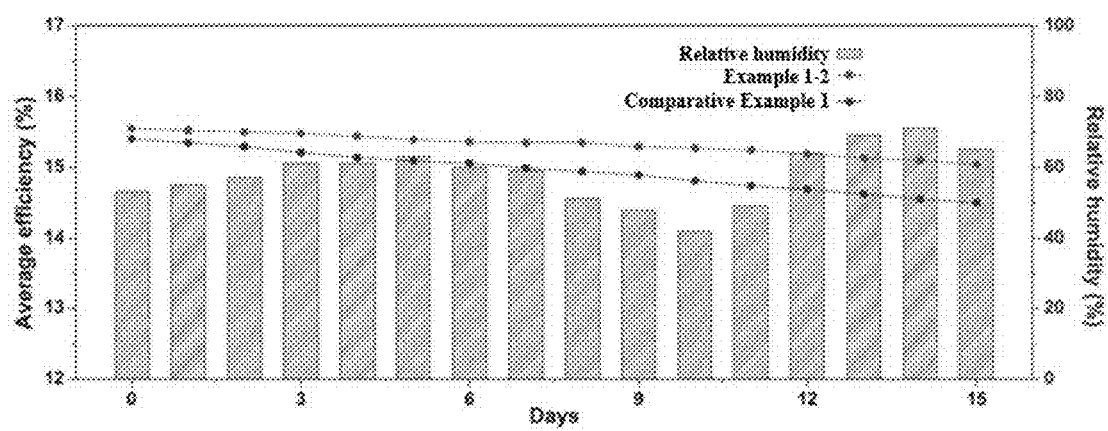
FIG. 7 illustrates results of measuring the change in efficiency of the perovskite solar cells prepared by using the metal/molybdenum oxide nanoparticles prepared according to an example of the present invention and a comparative example over time.

A result of analyzing the cross-section of the perovskite solar cell prepared according to Preparation Example 1 through SEM and changes in efficiency of the perovskite solar cell over time are shown in FIG. 6 and FIG. 7, respectively.

Referring to FIG. 6, it can be confirmed that an oxide nanoparticle layer of Ti/MoO$_2$ is formed in the perovskite solar cell.

Referring to FIG. 7, the efficiency of the perovskite solar cell in which molybdenum oxide nanoparticles prepared according to Example 1-2 and Comparative 1 were used as the hole-transporting material under an environment of a relative humidity of about 50% or more for 15 days was reduced by 2.6% and 5.2%, respectively. That is, it can be confirmed that in the case of metal-doped molybdenum oxide nanoparticles, crystal stability is improved, and thus, the efficiency of the perovskite solar cell is maintained over time even under a high humidity environment. In addition, since it is seen that absolute solar cell efficiency is higher than that in Comparative Example 1, metal particles doped in the molybdenum oxide nanoparticles may change the energy bandgap in the perovskite solar cell, thereby increasing the efficiency.

The method for preparing the metal/molybdenum oxide nanoparticles according to an aspect of the present invention can mass-produce metal/molybdenum oxide nanoparticles with a high surface area and improved crystal stability.

The effect of the present invention is not limited to the aforementioned effects and it should be understood to include all possible effects deduced from the configuration of the invention described in the detailed description or the claims of the present invention.

The above-described description of the present invention is provided for illustrative purposes, and a person skilled in the art to which the present invention pertains will understand that the present invention can be easily modified into other specific forms without changing the technical spirit or essential features of the present invention. Therefore, it should be understood that the above-described Examples are illustrative only in all aspects and are not restrictive. For example, each constituent element which is described as a singular form may be implemented in a distributed form, and similarly, constituent elements which are described as being distributed may be implemented in a combined form.

The scope of the present invention is represented by the claims to be described below, and it should be interpreted that the meaning and scope of the claims and all the changes or modified forms derived from the equivalent concepts thereto fall within the scope of the present invention.

What is claimed is:

1. A method for preparing metal/molybdenum oxide nanoparticles, the method comprising:
   (a) preparing polycrystalline molybdenum oxide particles; and
   (b) obtaining metal-doped molybdenum oxide nanoparticles by dissolving the polycrystalline molybdenum oxide particles and a metal precursor having a concentration of 1 to 10 wt % in a first solvent, and then performing a solvothermal reaction,
   wherein the metal precursor comprises one selected from a group consisting of Ti, Zr, Mn, Fe, Co, Cu, Ni, Pd, Ag, Au, and a mixture thereof, and
   wherein the metal-doped molybdenum oxide nanoparticles are represented by the following Chemical Formula 1:

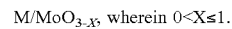
   M/MoO$_{3-X}$, wherein 0<X≤1.

2. The method of claim 1, wherein Step (a) comprises:
   (a1) preparing a precursor solution by dissolving a molybdenum salt in a second solvent;
   (a2) generating an aerosol by applying ultrasonic waves to the precursor solution, and spraying the aerosol into a reactor by using a carrier gas; and
   (a3) obtaining the polycrystalline molybdenum oxide particles by pyrolyzing the aerosol.

3. The method of claim 2, wherein the molybdenum salt is one selected from a group consisting of lithium molybdate (Li$_2$MoO$_4$), calcium molybdate (CaMoO$_4$), potassium molybdate (K$_2$MoO$_4$), sodium molybdate (NaMoO$_4$), molybdenum chlorides (MoCl$_5$, MoCl$_3$, MoOCl$_4$), ammonium molybdate ((NH$_4$)$_6$Mo$_7$O$_{24}$.H$_2$O), and a mixture thereof.

4. The method of claim 2, wherein the second solvent is one selected from a group consisting of methanol, ethanol, propanol, butanol, methoxyethanol, ethoxyethanol, lactones, acetonitrile, n-methyl-2-pyrrolidone (NMP), formic acid, nitromethane, acetic acid, dimethyl sulfoxide, distilled water, and a mixture thereof.

5. The method of claim 2, wherein a concentration of the precursor solution is 0.05 to 0.5 M.

6. The method of claim 2, wherein the carrier gas is one selected from a group consisting of air, nitrogen, oxygen, helium, argon, and a mixture thereof.

7. The method of claim 2, wherein in Step (a3), a pyrolysis temperature of pyrolyzing the aerosol is 450 to 650° C.

8. The method of claim 2, wherein in Step (a3), the polycrystalline molybdenum oxide particles are molybdenum trioxide (MoO3).

9. The method of claim 1, wherein the first solvent is a mixture of distilled water and a reducing solvent.

10. The method of claim 9, wherein the first solvent is prepared by mixing the distilled water and the reducing solvent at a weight ratio of 1 to 3:1.

11. The method of claim 1, wherein in Step (b), a temperature of the solvothermal reaction is 100 to 300° C.

12. The method of claim 1, wherein in Step (b), a time of the solvothermal reaction is 1 to 12 hours.

* * * * *